(12) United States Patent
Mente et al.

(10) Patent No.: US 6,464,820 B2
(45) Date of Patent: Oct. 15, 2002

(54) BINDER RESIN AND SYNERGIST COMPOSITION INCLUDING A PARTING AGENT AND PROCESS OF MAKING LIGNOCELLULOSIC

(75) Inventors: Donald C. Mente, Grosse Ile; Li-Mei Lu, Canton; David D. Peters, Wyandotte; Joe C. Wilson, Woodhaven; Anthony G. Schaefer, Wyandotte, all of MI (US)

(73) Assignee: BASF Corporation, Mt. Olive, NJ (US)

(*) Notice: Subject to any disclaimer, the term of this patent is extended or adjusted under 35 U.S.C. 154(b) by 0 days.

(21) Appl. No.: 09/751,145

(22) Filed: Dec. 29, 2000

(65) Prior Publication Data

US 2002/0121327 A1 Sep. 5, 2002

(51) Int. Cl.$^7$ .............. B27N 3/02; B27N 3/04
(52) U.S. Cl. ............ 156/296; 156/62.2; 156/331.4; 156/331.7; 264/109
(58) Field of Search .............. 156/62.2, 296, 156/331.4, 331.7; 264/109

(56) References Cited

U.S. PATENT DOCUMENTS

| | | | |
|---|---|---|---|
| 3,870,665 A | 3/1975 | Diehr et al. | |
| 3,919,279 A | 11/1975 | Rosenthal et al. | |
| 3,962,302 A | 6/1976 | Rosenthal et al. | |
| 4,100,328 A | 7/1978 | Gallagher | 428/407 |
| 4,257,995 A | 3/1981 | McLaughlin et al. | 264/122 |
| 4,257,996 A | 3/1981 | Farrissey, Jr. et al. | 264/122 |
| 4,344,798 A | 8/1982 | Gaul et al. | 106/123 LC |
| 4,373,083 A | 2/1983 | Seiner et al. | |
| 4,407,771 A * | 10/1983 | Betzner et al. | 264/115 |
| 4,490,517 A | 12/1984 | Fuzesi et al. | 527/401 |
| 4,742,144 A | 5/1988 | Nguyen | 528/26.5 |
| 4,822,850 A | 4/1989 | Yashuda et al. | |
| 4,983,338 A | 1/1991 | Schucker | 264/45.1 |
| 5,002,713 A | 3/1991 | Palardy et al. | |
| 5,096,945 A | 3/1992 | Sun | |
| 5,120,812 A | 6/1992 | O'Lenick, Jr. et al. | 528/28 |
| 5,151,238 A * | 9/1992 | Earl et al. | 264/109 |
| 5,200,267 A * | 4/1993 | Bauer | 428/326 |
| 5,283,311 A | 2/1994 | Narayan et al. | 528/49 |
| 5,554,438 A | 9/1996 | Marcinko et al. | 428/306.6 |
| 5,574,122 A | 11/1996 | Yeske et al. | |
| 5,660,763 A * | 8/1997 | Uhlig | 252/378 R |
| 5,977,398 A | 11/1999 | Komiya | |
| 6,086,998 A * | 7/2000 | Wihsmann et al. | 162/158 |
| 6,113,729 A * | 9/2000 | Chiu | 156/283 |

FOREIGN PATENT DOCUMENTS

| | | |
|---|---|---|
| EP | 0008723 | 3/1980 |
| EP | 0129430 | 12/1984 |
| EP | 0207192 | 1/1987 |
| JP | 2000-319678 A | * 11/2000 |
| WO | WO9814425 | 4/1998 |
| WO | WO9904943 | 2/1999 |

OTHER PUBLICATIONS

Hans–Joachim Deppe; "Technical Progress in Using Isocyanate as an Adhesive in Particleboard Manufacture"; *Proceedings of Eleventh Washington State University Symposium on Particleboard* (Mar. 1977); Pullman, Washington; pp. 13–31.

* cited by examiner

Primary Examiner—Sam Chuan Yao
(74) Attorney, Agent, or Firm—Fernando A. Borrego

(57) ABSTRACT

A method for preparing compression molded or pressed lignocellulosic articles is disclosed. The method involves forming a binder resin by combining a polyisocyanate component with a parting agent and preferably a synergist. The parting agent is the reaction product of an isocyanate compound and an isocyanate-reactive compound of the general structure R—(ao)$_n$—Y where: R is a hydrophobic group containing alkyl, alkaryl, polyaryl, or siloxane moieties; (ao) is an alkylene oxide or mixture of alkylene oxides; n is from 1 to 25; and Y represents a monofunctional isocyanate-reactive group. A resinated lignocellulosic mixture is formed by combining the binder resin with lignocellulosic particles. Then a compression molded or pressed lignocellulosic article is formed by compressing the resinated lignocellulosic mixture at an elevated temperature and under pressure. It is particularly preferred that the binder resin further include a synergist of either a $C_{1-4}$ N-alkylpyrrolidone, gamma-butyrolactone, or a mixtures of them. The most preferred synergist is N-methyl-2-pyrrolidine.

20 Claims, No Drawings

BINDER RESIN AND SYNERGIST COMPOSITION INCLUDING A PARTING AGENT AND PROCESS OF MAKING LIGNOCELLULOSIC

FIELD OF THE INVENTION

The invention relates to a process for making compression molded or pressed lignocellulosic articles by adding a binder resin including a parting agent to lignocellulosic particles and thereafter either pressing the mixture between plates or compressing it in a mold at an elevated temperature and pressure and, more specifically, a method for making compression molded or pressed boards using a binder resin comprising a polyisocyanate component, a parting agent and a synergist component.

BACKGROUND OF THE INVENTION

It is known to make compression molded or pressed lignocellulosic articles, such as particle board, Medium Density Fiberboard (MDF) agrifiber board (such as straw board or bagasse, etc.), and oriented strand board, by coating or contacting lignocellulosic particles with a binder resin to form a lignocellulosic mixture, optionally adding other additives including parting agents or wood preservatives and compressing the mixture at elevated temperatures and pressures for a time sufficient to make commercially useful articles, such as, boards.

The lignocellulosic particles can be in the form of chips, shavings, strands, wafers, fibers, sawdust, bagasse, straw and wood wool. When the particles are relatively larger in size, the boards produced by the process are known in the art under the general term of engineered wood. These engineered woods include panels, laminated strand lumber, oriented strand board, parallel strand lumber, and laminated veneer lumber. When the lignocellulosic particles are relatively smaller, the boards are known in the art as particleboard and fiber board.

The engineered wood products were developed because of the increasing scarcity of suitably sized tree trunks for cutting lumber. Such products can have advantageous physical properties such as strength and stability. Another advantage of the engineered wood and particle boards is that they can be made from the waste material generated by processing other wood and lignocellulosic materials. This leads to efficiencies and energy savings from the recycling process, and saves landfill space.

The binder used to make the lignocellulosic articles is typically a resinous material. One common class of binders are resins produced by polymerizing formaldehyde with other resin forming monomers, including urea, melamine, and phenol. In certain applications, articles made with such binders are deficient in some property such as water resistance.

Another class of binders are the organic diisocyanate or polyisocyanate binders. One of the advantages of this class is its superior resistance to water. A disadvantage of the typical isocyanate binders is their relatively high viscosity, which can lead to problems with delivery of the binder onto the particles. This high viscosity also requires that excess binder be used to fully coat the particles.

In the past various solvents have been added to the polyisocyanate binder compositions with the aim of achieving a lower viscosity and better handling properties. After application, the solvent generally evaporates during the molding process, leaving the bound particles behind. One major disadvantage of prior art solvents is that they cause a reduction in the physical properties of the formed board including a reduction in the internal bond strength of the formed board.

For example, it is known to use dialkyl carbonate solvents in isocyanate binder compositions for coating lignocellulosic particles prior to compression at high temperature and pressure to make manufactured lignocellulosic articles. The isocyanate binder compositions with dialkyl carbonates are reported to have a lower viscosity than the free isocyanates, leading to advantages in their use in the process.

In the above examples, however, the use of the solvent system does not lower the amount of isocyanate binder composition required for achieving best results, also the solvent systems generally lower the physical properties of the produced board.

It is therefore an object of the present invention to provide a solvent system for an isocyanate binder composition, which will not only act as a diluent but also increase the efficiency of the binder resin when it is used to coat or contact lignocellulosic particles prior to pressing at high temperature and pressure.

Another common disadvantage of the use of isocyanate binder resins is their poor release properties from molds or press parts used to form lignocellulosic articles, which can lead to problems during manufacture of the lignocellulosic articles when the mold or press parts stick to the articles.

To overcome the sticking, it is desirable to use a parting agent either internally as a component of the binder resin, or externally by applying it to the press parts between runs. External parting or release agents are less preferred because their use involves the extra step of applying the agents to the press parts.

It is therefore, an object of the present invention to provide a parting agent for an isocyanate binder resin, which will not only display the desired parting properties but will also be compatible with an isocyanate binder resin.

SUMMARY OF THE INVENTION

In one embodiment, the present invention is a method for preparing a compression molded or pressed lignocellulosic article comprising the steps of: forming a binder resin by combining from about 75 to 99.5 weight percent based on the total weight of the binder resin of a polyisocyanate component with from about 25 to 0.5 weight percent based on the total weight of the binder resin of a parting agent, comprising the reaction product of an isocyanate compound and an isocyanate-reactive compound of the general structure

$$R\text{—}(ao)_n Y$$

wherein R is a hydrophobic group containing alkyl, alkaryl, polyaryl, or siloxane moieties, wherein the alkyl moieties comprise straight chain or branched hydrocarbons with 6 or more carbon atoms, the alkaryl moieties comprise monoalkyl, dialkyl, or trialkyl substituted aromatic hydrocarbons with 9 or more carbon atoms, the polyaryl moieties comprise a polyphenyl structure that is either alkyl substituted or unsubstituted, and the siloxane moieties comprise a trisiloxane or higher polysiloxane; (ao) is an alkylene oxide or mixture of alkylene oxides selected from the group consisting of ethylene oxide, propylene oxide, butylene oxide, and mixtures thereof; n is from 1 to 25; and Y represents a monofunctional isocyanate-reactive group. In a second step a resinated lignocellulosic mixture is formed by combining from about 1 to 10 weight percent based on the total weight of the lignocellulosic mixture of the binder resin with from about 99 to 90 weight percent based on the total weight of the lignocellulosic mixture of lignocellulosic particles, the lignocellulosic particles having a moisture content of from 2 to 15 weight percent. Then a compression molded or pressed lignocellulosic article is formed by compressing the resinated lignocellulosic mixture at an elevated temperature and under pressure. It is particularly preferred that the binder resin further include a synergist selected from the group consisting of $C_{1-4}$ N-alkylpyrrolidones, gamma-butyrolactone, and mixtures thereof. The most preferred synergist is N-methyl-2-pyrrolidine.

DETAILED DESCRIPTION OF A PREFERRED EMBODIMENT OF THE INVENTION

In accordance with the present invention there is disclosed a process that utilizes an isocyanate binder resin for the preparation of lignocellulosic articles. The binder resin comprises an organic di- or polyisocyanate, a parting agent and optionally, a synergist selected from the group consisting of $C_1$–$C_4$ N-alkyl pyrrolidones, gamma-butyrolactone, and mixtures thereof. Throughout the present specification and claims the terms compression molded or pressed are intended to refer to the same process whereby the article is formed by either compression molding the article in a mold or by using compression as between a pair of plates from a press. In both procedures pressure and heat are used to form the article and to set the binder.

In the present specification and claims the term polyisocyanate component is intended to include a single polyisocyanate and mixtures of polyisocyanates. The isocyanate compounds useful in the present invention comprise the organic di- and polyisocyanates, modified isocyanates, isocyanate-terminated prepolymers, and mixtures of these isocyanates, all described below. Organic polyisocyanates which may be used include aliphatic, alicyclic and aromatic polyisocyanates characterized by containing two or more isocyanate groups. Such polyisocyanates include the diisocyanates and higher functionality isocyanates, particularly the aromatic polyisocyanates. Mixtures of polyisocyanates which may be used include, crude mixtures of di- and higher functionality polyisocyanates produced by phosgenation of aniline-formaldehyde condensates or as prepared by the thermal decomposition of the corresponding carbamates dissolved in a suitable solvent, as described in U.S. Pat. No. 3,962,302 and U.S. Pat. No. 3,919,279, the disclosures of which are incorporated herein by reference, both known as crude diphenylmethane diisocyanate (MDI) or polymeric MDI. The organic polyisocyanate may be isocyanate-terminated prepolymers made by reacting under standard known conditions, an excess of a polyisocyanate with a polyol which, on a polyisocyanate to polyol basis, may range from about 20:1 to 2:1. The polyols include, for example, polyethylene glycol, polypropylene glycol, diethylene glycol monobutyl ether, ethylene glycol monoethyl ether, triethylene glycol, etc., as well as glycols or polyglycols partially esterified with carboxylic acids including polyester polyols and polyether polyols.

The organic polyisocyanates or isocyanate-terminated prepolymer may also be used in the form of an aqueous emulsion by mixing such materials with water in the presence of an emulsifying agent. The isocyanate compound may also be modified isocyanates, such as, carbodiimides, allophanates, isocyanurates, and biurets.

Also illustrative of the di- or polyisocyanates which may be employed are, for example: toluene-2,4- and 2,6-diisocyanates or mixtures thereof; diphenylmethane-4,4'-diisocyanate and diphenylmethane-2,4'-diisocyanate or mixtures of same, the mixtures preferably containing about 10 parts by weight 2,4'- or higher, making them liquid at room temperature; polymethylene polyphenyl isocyanates; naphthalene-1,5-diisocyanate; 3,3'-dimethyl diphenylmethane-4,4'-diisocyanate; triphenyl-methane triisocyanate; hexamethylene diisocyanate; 3,3'-ditolylene-4,4-diisocyanate; butylene 1,4-diisocyanate; octylene-1,8-diisocyanate; 4-chloro-1,3-phenylene diisocyanate; 1,4-, 1,3-, and 1,2-cyclohexylene diisocyanates; and, in general, the polyisocyanates disclosed in U.S. Pat. No. 3,577,358, the disclosure of which is incorporated herein by reference. Preferred polyisocyanates include 2,4'-MDI, 4,4'-MDI, 2,2'-MDI, polymeric MDI, and mixtures thereof.

Typical of the preferred isocyanates are those sold under the trademark Lupranate® by BASF Corporation. For example Lupranate®, an isomeric blend of 2,4' and 4,4' MDI isomers or Lupranate® M20 SB, a polymeric MDI.

The synergist component useful in the resin binders of the present invention includes lower N-alkylpyrrolidones. In general, the C1–C4 N-alkylpyrrolidones are useful in the present invention, with the preferred N-alkylpyrrolidone being N-Methyl-2-pyrrolidone. Other useful synergists include gamma-butyrolactone. Mixtures of the above synergists can also be used to form the synergist component.

The resin binder of the present invention can also contain other solvents, so long as the physical properties of the resulting lignocellulosic article are not adversely affected. For example, it is preferred to avoid xylene as a component of the resin binder, because the use of xylene leads to a lower value of internal bond in the resulting lignocellulosic article.

The resin binder can also contain other conventional additives, such as parting agents or wood preservatives. Suitable parting agents are described fully below. When the resin binder includes such optional additives, efficiency is gained because the resin binder and any other necessary ingredients can be coated onto the lignocellulosic particles in a single step.

The synergist component can be combined with the polyisocyanate component in an amount from 0.5 to 25 weight percent based on the total weight of the binder resin. More preferably, the binder resin includes from 0.5 to 15 weight percent, and most preferably 0.5 to 10 weight percent synergist based on the total weight of the binder resin. The binder resin preferably comprises from about 75 to 99.5 weight percent polyisocyanate component, and more preferably from about 85 to 99 weight percent polyisocyanate component based on the total weight.

The lignocellulosic particles can be derived from a variety of sources. They can come from wood and from other products such as bagasse, straw, flax residue, nut shells, cereal grain hulls, and mixtures thereof. Non-lignocellulosic materials in flake, fibrous or other particulate form, such as glass fiber, mica, asbestos, rubber, plastics and the like, can be mixed with the lignocellulosic material. The lignocellulosic particles can come from the process of comminuting small logs, industrial wood residue, branches, or rough pulpwood into particles in the form of sawdust, chips, flakes, wafer, strands, medium density fibers (MDF), and the like. They can be prepared from various species of hardwoods and softwoods. It is important that the lignocellulosic particles have a moisture content of from 2 to 15 weight percent. In a further preferred embodiment the water content is from 3 to 12 weight percent, and most preferably from 4 to 10 weight percent. The water is utilized during the curing of the binder resin. If the water content is outside of this range the binder resin is not as efficient at forming the molded article.

The lignocellulosic particles can be produced by various conventional techniques. For example, pulpwood grade logs can be converted into flakes in one operation with a conventional roundwood flaker. Alternatively, logs and logging residue can be cut into fingerlings on the order of about 0.5 to 3.5 inches long with a conventional apparatus, and the fingerlings flaked in a conventional ring type flaker. The logs are preferably debarked before flaking.

The dimensions of the particles are not particularly critical. Flakes commonly have an average length of about 2 to 6 inches, and average width of about 0.25 to 3 inches, and an average thickness of about 0.005 to about 0.05 inches. Strands which are about 4 cm wide and 12 cm long can be used to make laminated strand lumber, while strands about 0.3 cm wide and 25 cm long can be used to make parallel strand lumber.

The wood particles can be further milled prior to use in the process of the invention, if such is desired to produce a size more suitable for producing the desired article. For example, hammer, wing beater, and toothed disk mills may be used.

The lignocellulosic particles are resinated using the binder resin described above. The binder resin and the lignocellulosic particles are mixed or milled together during the formation of a resinated lignocellulosic mixture. Generally, the binder resin can be sprayed onto the particles while they are being agitated in suitable equipment. To maximize coverage of the particles, the binder resin is preferably applied by spraying droplets of the binder resin onto the particles as they are being tumbled in a rotary blender or similar apparatus. For example, the particles can be resinated in a rotary drum blender equipped with at least one spinning disk atomizer. One advantage of the present invention is that the binder resin forms smaller droplets than typical polyisocyanate binder resins leading to better coverage of the particles.

For testing on a lab scale, a simpler apparatus can suffice to resinate the particles. For example, a 5 gallon can is provided with baffles around the interior sides, and a lid with a hole large enough to receive the nozzle of a spray gun or other liquid delivery system, such as a pump sprayer. It is preferred that the binder resin be delivered as a spray. The particles to be resinated are placed in a small rotary blender. The blender is rotated to tumble the particles inside against the baffles, while the desired amount of binder resin is delivered with a spray device. After the desired amount of binder resin is delivered, the particles can be tumbled for a further time to effect the desired mixing of the particles with the binder resin.

The amount of binder resin to be mixed with the lignocellulosic particles in the resinating step is dependant upon several variables including, the binder resin used, the size, moisture content and type of particles used, the intended use of the product, and the desired properties of the product. Generally, the amount of binder resin to mixed with the particles is from 1 to 10 weight percent based on the total weight of the resinated lignocellulosic mixture. In a preferred embodiment the amount of binder resin is from 1 to 4 weight percent based on the total weight of the resinated lignocellulosic mixture.

The mixture produced during the resinating step is referred to in the art as a furnish. The resulting furnish, i.e., the mixture of flakes, binder resin, parting agent, and optionally, wax, wood preservatives and/or other additives, is formed into a single or multi-layered mat that is compressed into a particle board or flakeboard panel or another composite article of the desired shape and dimensions. The mat can be formed in any suitable manner. For example, the furnish can be deposited on a plate-like carriage carried on an endless belt or conveyor from one or more hoppers spaced above the belt. When a multi-layer mat is formed, a plurality of hoppers are used with each having a dispensing or forming head extending across the width of the carriage for successively depositing a separate layer of the furnish as the carriage is moved between the forming heads. The mat thickness will vary depending upon such factors as the size and shape of the wood flakes, the particular technique used in forming the mat, the desired thickness and density of the final product and the pressure used during the press cycle. The mat thickness usually is about 5 to 20 times the final thickness of the article. For example, for flakeboard or particle board panels of ½ inch thickness and a final density of about 35 lbs/ft$^3$, the mat usually will be about 3 to 6 inches thick. After mat formation, a paper overlay, like that used in furniture panels or for exterior siding, can be applied to the mat prior to pressing.

Press temperatures, pressures and times vary widely depending upon the shape, thickness and the desired density of the composite article, the size and type of wood flakes, the moisture content of the wood flakes, and the specific binder used. The press temperature can be from about 100° to 300° C. In order to minimize generation of internal steam and the reduction of the moisture content of the final product below a desired level, e.g., about 8 to about 12%, the press temperature preferably is less than about 250° C. and most preferably from about 180° to about 240° C. The pressure utilized is generally from about 300 to about 800 pounds per square inch. Preferably the press time is from 120 to 350 seconds. The press time utilized should be of sufficient duration to at least substantially cure the binder resin and to provide a composite article of the desired shape, dimension and strength. For the manufacture of flakeboard or particle board panels, the press time depends primarily upon the panel thickness of the article produced. The pressure applied by the press is correlated with the press temperature so that the moisture content of the final product is from about 8 to 12%. For example, the press time is generally from about 200 to about 300 seconds for a pressed article with a ½ inch thickness.

Oriented Strand Board Manufacture

Oriented strand board (OSB) can be made by the process of the invention from a plurality of discrete generally oriented strands or strips of wood hot pressed together using a binder resin, such as the binder resin of the present invention described above. The pieces or strips of wood are, for example, plywood or veneer strips having a width of about ¼ inch to ⅜ inch, a length of about 2½ inches to about 3 inches and a thickness of about 20 mils. The strips of wood are generally oriented so that the fiber direction is approximately the same. The resinated, oriented strips are disposed into a press or mold so that the strips are in contact with other strips both vertically and horizontally so that when pressed under heat and pressure the strips are compressed tightly against other contacting strips to adhere the strips together and to mold a sheet of material having desired dimensions. The strands or strips of wood material are not perfectly aligned in one fiber direction (approximately ±20° from a single direction) so that some strips overlap other adjacent strips for stronger adhesion.

Oriented strand boards are prepared in a pilot plant according to the process described above. The strands are obtained from a commercial mill and are predominantly poplar. The strands are resinated in a rotary drum blender equipped with at least one single spinning disk atomizer using 2.5 weight percent of the binder resin. Such blenders are known in the art and are available from suppliers such as Coil Manufacturing, they typically include up to six spinning disk atomizers in each blender. The press cycle is a total of 4 minutes with a press temperature of about 205° C. A commercially available external release agent, a water based organosiloxane emulsion, is coated on the inner mold surfaces. The target size of the boards is 2 feet by 2 feet by 7/16 inch, with a density of 39 pounds per cubic foot. A total of 24 boards are produced. Twelve of the boards are produced by a conventional process, wherein the resination step is accomplished with a binder resin containing only Lupranate® M20 SB ("M20SB"), a polymeric MDI material sold by BASF Corporation. The other twelve are produced by the process of the current invention, wherein the binder resin contains 10 weight percent of N-methyl-2-pyrrolidone ("NMP") and 90 weight percent of Lupranate® M20 SB. Eight boards, four from each group of twelve, were randomly chosen for evaluation of average density and internal bond strength (IB). The results are given in Table 1.

In Table 1, the IB is given in units of pounds per square inch, or psi. Internal bond strength, is a commonly measured parameter of lignocellulosic articles manufactured by pressing binder coated wood particles at high temperature and pressure. It measures the effectiveness of the binder resin. The higher the IB, the stronger is the article or board made by the process. For Table 1, IB is measured according to ASTM D-1037.

TABLE 1

ORIENTED STRAND BOARDS

| Example | Binder Resin composition | Density, (lbs/ft$^3$) | IB (psi) |
|---|---|---|---|
| 1 | 100% M20SB | 38.7 | 51.8 |
| 2 | 100% M20SB | 39 | 56.1 |
| 3 | 100% M20SB | 38.1 | 39.0 |
| 4 | 100% M20SB | 40.4 | 45.5 |
| 5 | 90% M20SB + 10% NMP | 40.4 | 63.9 |
| 6 | 90% M20SB + 10% NMP | 39.9 | 55.3 |
| 7 | 90% M20SB + 10% NMP | 40.2 | 52.1 |
| 8 | 90% M20SB + 10% NMP | 39 | 51.6 |
| Average | 100% M20SB | 38.8 | 48.1 |
| Average | 90% M20SB + 10% NMP | 39.9 | 55.7 |

It is seen from Table 1 that boards made using a binder resin where 10% of the polymeric MDI is replaced by NMP are at least as strong, based on measurement of IB, as are boards made using a binder which is 100% MDI. In fact, the results suggest that the NMP enhances the strength of the formed internal bonds (average of 55.7 with 10% NMP versus 48.1 with no NMP). While not wishing to be bound by any particular theory it is believed that the NMP dissolves the lignin in the lignocellulosic material thereby enhancing the penetration of the binder resin and its adhesion to the lignocellulosic particles.

In another experiment boards are prepared as described above using several levels of NMP and the viscosity of the binder resin is measured in addition to IB. The results below in Table 2.

TABLE 2

ORIENTED STRAND BOARDS

| Example | Binder resin composition | Viscosity at 25° (centipoise) | Density, (lbs/ft$^3$) | IB (psi) |
|---|---|---|---|---|
| 1 | 100% M20SB | 209 | 38.9 | 54 |
| 2 | 95% M20SB + 5% NMP | 130 | * | * |
| 3 | 90% M20SB + 10% NMP | 83 | 39.9 | 56 |

* not determined

The results demonstrate the significant reduction of viscosity provided by the present binder resin without a reduction in the internal bond strength that would be expected based on typical solvents.

The present invention further teaches a parting agent, which comprises the reaction production of an isocyanate compound and an isocyanate-reactive compound for use with the binder resin of the present invention.

The isocyanate compounds useful in the parting agent comprise the organic di- and polyisocyanates, modified isocyanates, isocyanate-terminated prepolymers, and mixtures of these isocyanates, all described below.

The isocyanate compound which may be used includes aliphatic, alicyclic and aromatic polyisocyanates characterized by containing two or more isocyanate groups. Such polyisocyanates include the diisocyanates and higher functionality isocyanates, particularly the aromatic polyisocyanates. Mixtures of polyisocyanates may also be used and include, crude mixtures of di- and higher functionality polyisocyanates produced by phosgenation of aniline-formaldehyde condensates or as prepared by the thermal decomposition of the corresponding carbamates dissolved in a suitable solvent, as described in U.S. Pat. No. 3,962,302 and U.S. Pat. No. 3,919,279, both known as crude diphenylmethane diisocyanate (MDI) or polymeric MDI.

The organic polyisocyanate may be an isocyanate-terminated prepolymer prepared by reacting, an excess of a polyisocyanate with a polyol which, on a polyisocyanate to polyol basis, may range from about 20:1 to 2:1. The polyols include, for example, polyethylene glycol, polypropylene glycol, diethylene glycol monobutyl ether, ethylene glycol monoethyl ether, triethylene glycol, etc., as well as glycols or polyglycols partially esterified with carboxylic acids including all polyester polyols, and all polyether polyalkylene polyols. Such polyols are well known in the art and will not be further described.

The isocyanate compound may also be modified isocyanates, such as, carbodiimides, allophanates, isocyanurates, and biurets.

Also illustrative of the di- or polyisocyanates which may be employed are, for example: toluene-2,4- and 2,6-diisocyanates or mixtures thereof; diphenylmethane-4,4'-diisocyanate and diphenylmethane-2,4'-diisocyanate or mixtures of same, the mixtures preferably containing about 10 parts by weight 2,4'-MDI or higher, making them liquid at room temperature; polymethylene polyphenyl isocyanates; naphthalene-1,5-diisocyanate; 3,3'-dimethyl diphenylmethane4,4'-diisocyanate; triphenyl-methane tri-isocyanate; hexamethylene diisocyanate; 3,3'-ditolylene-4,4-diisocyanate; butylene 1,4-diisocyanate; octylene-1,8-diisocyanate; 4-chloro-1,3-phenylene diisocyanate; 1,4-, 1,3-, and 1,2-cyclohexylene diisocyanates and; in general, the polyisocyanates disclosed in U.S. Pat. No. 3,577,358, the disclosure of which is incorporated herein by reference.

Preferred polyisocyanates include 2,4'-MDI, 4,4'-MDI, 2,2'-MDI, polymeric MDI, and mixtures thereof.

Typical of the suitable polyisocyanates are those sold under the trademark Lupranate® by BASF Corporation. For example, Lupranate® MI, an isomeric blend of 2,4' and 4, 4' MDI isomers, or Lupranate® M20 SB, a polymeric MDI.

The isocyanate-reactive compound can be represented by the general structure $R(ao)_n Y$. Here Y represents a monofunctional group which is reactive with isocyanates. Examples include monoalkylamino and hydroxyl, with hydroxyl being preferred. In the structure above, (ao) represents an alkylene oxide or mixture of alkylene oxides such as ethylene oxide, propylene oxide, butylene oxide, and mixtures thereof; n refers to the number of alkylene oxide units in the isocyanate-reactive compound. It is conventional to use the symbol $(ao)_n$ to represent a polyoxyalkylene chain comprising, on average, n repeating units of alkylene oxide. In the invention, a preferred alkylene oxide is ethylene oxide. The variable n can be integer or non-integer and is in general from about 1 to about 25, more preferably from about 2 to about 25, and most preferably from about 3 to about 10.

In the isocyanate reactive compound $R-(ao)_n-Y$, R represents a hydrophobic group. The hydrophobic group is based either on hydrocarbons or on silicon-containing compounds.

Preferred hydrocarbon hydrophobic groups include in general those containing alkyl, alkaryl or polyaryl moieties. Alkyl moieties useful in the invention include those with about 6 or more carbon atoms. Examples are hexyl, octyl, nonyl, decyl, dodecyl, and hexadecyl. Useful alkaryl moieties include the aryl hydrocarbons such as alkaryl, dialkaryl, and trialkaryl hydrocarbons, wherein the alkyl groups contain at least about 3 carbon atoms. Together with the 6 carbon atoms of the aromatic ring, there are thus 9 or more carbon atoms in the preferred alkaryl, dialkaryl, and trialkaryl hydrocarbons. Examples include octylphenyl, hexylphenyl, nonylphenyl, dioctylphenyl, dinonylphenyl, trioctylphenyl, trinonylphenyl, and trialkarylphenyl groups. Particularly preferred are the alkaryl and dialkaryl groups such as nonylphenyl and dinonylphenyl. The polyaryl compounds have the general structure of a polyphenyl structure that is either alkyl substituted or unsubstituted. Thus in the present specification and claims the term polyaryl means a polyphenyl structure that is either alkyl substituted or unsubstituted.

Examples of isocyanate-reactive compounds useful in the invention thus include alcohol alkoxylates, alkylphenol alkoxylates, and dialkylphenol alkoxylates. Examples of alcohol alkoxylates include the fatty alcohol ethoxylates which are made by adding 2–20 units of ethylene oxide onto a $C_6$–$C_{18}$ straight chain or branched alcohol. These are available commercially, for example, under the Iconol® trademark from BASF Corporation. Examples of useful alkylphenol alkoxylates include those made from alkylphenols having three or more carbons in the alkyl chain attached to the phenol ring. Commonly available commercial alkylphenol alkoxylates include octylphenol ethoxylates and nonylphenol ethoxylates which are made by adding about 2 to about 20 units of ethylene oxide to octylphenol or nonylphenol. They are sold, for example, under the tradenames Iconol® OP and Iconol® NP by BASF Corporation. Similarly, dialkylphenol ethoxylates are useful in the invention. Examples are alkoxylates of those dialkylphenols or trialkylphenols having three or more carbon atoms in each alkyl group. Especially preferred are the ethoxylates of dialkyl- or trialkylphenols made by adding about 2 to about 20 units of ethylene oxide to, for example, a dialkylphenol such as dioctylphenol or dinonylphenol. Dinonylphenol ethoxylates are available commercially from BASF Corporation under the Macol® DNP tradename.

Where R represents silicon-containing compounds, the preferred hydrophobic group comprises siloxane groups. Generally preferred are the dimethylsiloxanes including trisiloxanes and higher polysiloxanes. A preferred isocyanate-reactive compound comprises a silicone compound of general structure

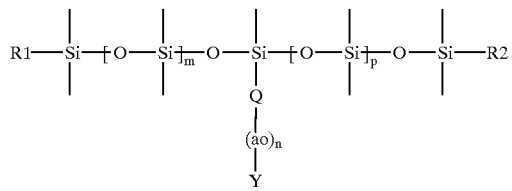

wherein Q is a bridging group of one or more atoms, m is 0–10, p is 0–10, R1 and R2 are independently alkyl or alkaryl groups containing 1 to 18 carbon atoms, (ao) is an alkylene oxide or mixture of alkylene oxides selected from the group consisting of ethylene oxide, propylene oxide, butylene oxide, and mixtures thereof, Y represents a monofunctional isocyanate reactive group, and n is from about 2 to about 20.

Preferably R1 and R2 are alkyl groups containing 1–10 carbon atoms. More preferably, R1 and R2 contain 1–4 carbon atoms. Most preferably, R1 and R2 are methyl. R1 and R2 may be different, but it is preferred that they be the same. It is particularly preferred that R1 and R2 are both methyl. The subscripts m and p are preferably from zero to 2; in a particularly preferred embodiment, m and p are both zero. When m and p are both zero, the compound is a trisiloxane. Where the sum of m and p is greater than zero, the compound is a higher polysiloxane. A particularly preferred trisiloxane containing isocyanate-reactive compound is commercially available from BASF Corporation as Masil® SF-19.

Such silicon containing isocyanate-reactive compounds can be synthesized, for example, by the reaction of R1,R2-terminated hydro-functional polysiloxane of general structure

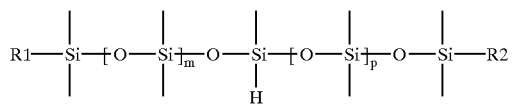

where R1, R2, m, and p have the same meaning as above, with an adduct of an unsaturated alcohol and alkylene oxides. The adduct can be prepared by reacting the unsaturated alcohol with ethylene oxide or a mixture of alkylene oxides in the presence of base catalysis. Thus, when the unsaturated alcohol is allyl alcohol, the adduct will have the general structure $CH_2=CH-CH_2-(ao)_n-OH$, where ao represents the ethylene oxide units or mixture of alkylene oxide units, and n represents the degree of alkoxylation. When the olefin of the allyl alcohol adduct reacts with the Si-H bond of the hydro-functional polysiloxane, a bridging group Q is formed consisting of the three carbon atoms of the ally alcohol portion of the adduct.

When Y of the isocyanate reactive compound comprises a hydroxyl group the reaction product will contain urethane linkages formed from the reaction of the isocyanate groups of the isocyanate compound with the hydroxyl group of the isocyanate-reactive compound. Similarly when Y comprises an alkylamino or other nitrogen containing isocyanate-reactive group, the resulting reaction product will contain urea linkages, based on the reaction of the isocyanate groups with the nitrogen of the isocyanate-reactive compound.

The parting agents of the present invention may also contain chemical modifications of the urethane or urea linkage, such as allophanates, carbodiimides, biurets, and uretonimines. In general allophanate linkages are formed from the reaction of an isocyanate group with a urethane group. Generally the allophanate reaction is carried out with special allophanate catalysts and at a temperature relatively higher than that at which the urethane is formed from the reaction of isocyanate and hydroxyl.

The parting agent of the present invention can be prepared or synthesized by a number of routes. In general, an isocyanate compound and an isocyanate-reactive compound of general structure $R(ao)_n Y$ are charged together into a reaction vessel.

Thereafter, they are allowed to react for a time sufficient to react out substantially all of the Y groups on the isocyanate-reactive compound and all of the isocyanate groups on the isocyanate compound Preferably there is less than 2.5 % residual free NCO after the formation of the parting agent, more preferably less than 1.0% and most preferably less than or equal to 0.2% free NCO after the reaction is complete. It is desirable to have these very low levels of free NCO when using the parting agent in a binder resin for wood particles, as described below. These low levels of free NCO prevent migration of the parting agent into the wood particles. Excess isocyanate reactive compound can be tolerated because it does not present any such problem.

Where the isocyanate compound and isocyanate-reactive compound are charged in stoichiometrically equivalent amounts, there is produced a parting agent which contains either urethane linkages or urea linkages, depending on whether Y in the isocyanate-reactive compound is a hydroxyl group or an alkylamino group, respectively. For this reaction the reaction temperature is set at a temperature of about 40° C. to about 100° C. Higher or lower temperatures can also be used, but the given range provides good results. The reaction can be monitored by following the isocyanate number of the reaction product over time. The reaction can be stopped when the desired isocyanate number is reached. The reaction will proceed without catalysts. However urethane catalysts may be added to the reaction mixture. Examples of suitable catalysts include potassium octoate, zinc acetylacetonate, potassium hydroxide, and organo tin compounds.

To form parting agents which contain allophanate linkages, further steps are required. For example, after charging the isocyanate compound and the isocyanate-reactive compound in stoichiometrically equivalent amounts and reacting at a temperature of from about 40° C. to about 100° C. until the desired intermediate isocyanate number is reached, a second charge of the isocyanate compound can be added to the reaction vessel. Further reaction is then carried out at a second temperature higher than about 40° C. to about 100° C. for a period of time sufficient to react substantially all of the isocyanate added in the second charge. Along with the second charge of isocyanate compound, it is generally necessary to also add a catalyst which aids in the formation of the allophanate groups. Such allophanate catalysts are known in the art and include zinc acetylacetonate, titanium tetrabutoxide, and ferric chloride. The allophanate reaction is preferably carried out at a temperature of about 100° C. to about 150° C.

An alternative method for producing parting agents containing allophanate groups is as follows. First an isocyanate compound and an isocyanate-reactive compound are charged to a reaction vessel in an amount such that the molar ratio of the isocyanate compound to $R(ao)_n Y$ is greater then 1:1, that is, such that there is a molar equivalent excess of the isocyanate compound in the reaction vessel. The mixture thus charged is then reacted at a temperature of from about 40° C. to about 100° C. until substantially all of the $R(ao)_n Y$ has reacted. The reaction can be monitored by following the free isocyanate number during the reaction. When the desired intermediate % free NCO is reached, the mixture is then reacted at a second temperature higher than about 40° C. to about 100° C. The reaction proceeds until substantially all of the isocyanate compound has reacted and the isocyanate content of the reaction product is equal to or less than the desired level.

Although if the reaction is carried out at high temperatures for a sufficiently long time, an allophanate catalyst is not absolutely required, it is in general preferred in the last step to also add conventional allophanate forming catalysts such as those described above. The allophanate catalysts may be charged to the vessel prior to the reaction at the first temperature of from about 40° C. to about 100° C. Alternatively, the allophanate catalysts may be charged after reacting at the first temperature but prior to the reaction at the second higher temperature. In general, the allophanate catalyst and the temperature of reaction are chosen such that during the reaction of the isocyanate compound and isocyanate-reactive compound in the first step, the temperature is lower than that required for efficient allophanate formation. In the reaction at the second temperature the temperature is high enough to efficiently convert the remaining isocyanate groups to allophanate.

Allophanates can be formed when an amount of isocyanate compound in stoichiometric excess to that of the isocyanate-reactive compound is charged to the reaction vessel. As discussed above, the charge of excess isocyanate compound can be accomplished in the first step along with the charge of isocyanate-reactive compound, where the conditions of catalysis and temperature are such that the excess isocyanate will not react further with the urethane or urea linkage being formed in the reaction of the isocyanate compound and the isocyanate-reactive compound. Alternatively, the excess isocyanate can be introduced following the reaction of stoichiometric amounts of isocyanate-reactive compound and isocyanate compound.

In either case, in general, any amount of excess isocyanate can be added to the reaction mixture. However, it is preferred in making the parting agent of the present invention to use an excess of isocyanate compound on the order of about 1 to 10 equivalent percent. That is, there should preferably be about a 1 to 10 percent excess of isocyanate groups over isocyanate-reactive groups. It can thus be seen that when parting agents of the present invention are made which contain allophanate linkages, the compositions will also in general contain urea or urethane linkages.

The parting agent and the organic di- or polyisocyanate which comprises the binder resin should be chosen such that they are compatible. That is, the two components should be readily soluble in each other, so that a single phase composition can be obtained. To this end, it is preferred that the organic di- or polyisocyanate and the isocyanate compound on which the parting agent is based should have a similar structure. Therefore, a preferred binder resin is one where the organic di- or polyisocyanate comprises an aromatic di- or polyisocyanate and wherein the isocyanate compound on which the parting agent is based is also aromatic.

Preferred organic di- or polyisocyanate include methylenediphenyl diisocyanate isomers such as 2,4'-MDI, 4,4'-MDI, 2,2'-MDI. A suitable isocyanate compound is Lupranate® MI, which is a mixture of 2,4' and 4,4'-MDI isomers, available from BASF Corporation. Another preferred organic di- or polyisocyanate is polymeric MDI. Mixtures of the above preferred di- or polyisocyanates may also be used. A particularly preferred polyisocyanate comprises polymeric MDI. A useful commercially available polymeric MDI material is Lupranate® M20S isocyanate sold by BASF Corporation.

PARTING AGENT EXAMPLES

Example 1 below describes the synthesis of a parting agent wherein the isocyanate compound is a mixture of diphenylmethane diisocyanate isomers, R comprises dialkaryl, Y is hydroxyl, and n is about 10. Example 2 describes the synthesis of a parting agent wherein the isocyanate compound is a mixture of diphenylmethane diisocyanate isomers, R comprises trisiloxane, and Y is hydroxyl. Example 3 demonstrates formation of a parting agent wherein the hydrophobic group is an alkaryl. Example 4 is similar to Example 3 with the addition of a catalyst.

Lupranate® MI isocyanate is a mixture of diphenylmethylene diisocyanates sold by BASF Corporation. Macol® DNP-IO is an average 10 mole ethoxylate of dinonylphenol, and Iconol® NP-6 is an average 6 mole ethoxylate of nonylphenol; they are commercially available from BASF Corporation.

Example 1

Synthesis of an Internal Parting Agent Where the Hydrophobic Group is Dialkaryl

Macol® DNP-10 surfactant (428.4 g) is placed in a one liter two neck flask and heated to 45° C. With continuous agitation, Lupranate® MI isocyanate (71.6 g) is added dropwise over a period of an hour. The temperature is increased to 80° C. and the reaction is continued for 20 to 24 hours. Titration of remaining free NCO groups shows a % free NCO of about 0.5%. The temperature is maintained for an additional one hour, the reaction mixture is cooled to room temperature and allowed to stand overnight. Titration of free NCO after the overnight period shows the reaction is complete—that is, the measured free NCO is 0.1%, which is within the error of the method.

Example 2

Synthesis of an Internal Parting Agent Where the Hydrophobic Group is Silicon

Masil® SF-19 surfactant (423 g) is placed in a one liter three neck flask and heated to 80° C. with continuous agitation provided by an overhead stirrer. Lupranate® MI isocyanate (77g) is added dropwise over a period of about 30 minutes. The temperature is increased to 90° C. and the reaction is continued for 20–24 hours, after which time the % free NCO is determined by titration and found to be ca. 0.5%. The reaction is continued for an additional 2 hours at 90° C., the reaction mixture cooled to room temperature and allowed to stand overnight. Titration of free NCO shows the reaction is complete.

Example 3

Synthesis of an Internal Parting Agent Where the Hydrophobic Group is Alkaryl.

Iconol® NP-6 (393.5 g) is placed in a one liter two neck flask and heated to 45° C. With continuous agitation, Lupranate® MI (106.5 g) is added dropwise over a period of an hour. The temperature is increased to 80° C. and the reaction is continued for 20 to 24 hours. Titration of remaining free NCO groups shows a % free NCO of about 0.5%. The temperature is maintained for an additional one hour, the reaction mixture is cooled to room temperature and allowed to stand overnight. Titration of NCO the following morning shows the free NCO is 0.1%, which is within the error of the method, thus the reaction is complete.

Example 4

Synthesis of an Internal Parting Agent Where the Hydrophobic Group is Alkaryl.

Lupranate® MI (106.5 g) is placed in a one liter two neck flask and heated to 45° C. With continuous agitation, Iconol® NP-6 (393.5 g) and 20 ppm of the urethane catalyst DABCO T-12 is added dropwise over a period of an hour. The temperature is increased to 80° C. and the reaction is continued for 9 hours. Titration of remaining free NCO groups shows a % free NCO of about 0.5%. The temperature is maintained for an additional one hour, the reaction mixture is cooled to room temperature and allowed to stand overnight. Titration of NCO the following morning shows the free NCO is 0.1%, which is within the error of the method, thus the reaction is complete.

Procedure For Evaluation Of Parting Agent

The following procedure was used to test the parting agents of the present invention prepared as in Examples 1—3. Results of the experiments are given in Table 3 below.

1. The stainless steel caul plates are preconditioned with external mold release (i.e. spray a dilute solution of external press release on the caul plate, then wipe off the excess with a paper towel). In the Examples, XCTW-9495, a water based organosiloxane was used as the external mold release.

2. Raw material (wood fiber, wood flake, wood particle, saw dust, etc.) is blended with a binder resin comprising Lupranate® M20SB, a polymeric MDI sold by BASF Corporation, a parting agent prepared in accordance with the present invention, and, optionally, a synergist component to form a furnish material. The optional synergists include the lower N-alkyl pyrrolidones. In general, the $C_1$-$C_4$ N-alkylpyrrolidones are useful in the present invention, with the preferred N-alkyl pyrrolidone being N-methyl-2-pyrrolidone (NMP). Other useful synergists include gamma-butyrolactone. Mixtures of the above synergists can also be used to form the synergist component. The synergist component can be combined with the polyisocyanate component in an amount of from 0.5 to 25 weight percent based on the total weight of the binder resin. More preferably, the binder resin includes from about 0.5 to 15 weight percent, and most preferably from about 0.5 to 10 weight percent synergist based on the total weight of the binder resin.

3. The parting agent and synergist used, are reported in the Examples as weight percent based on the total weight of the binder resin. Between 2.5% and 10% by weight binder resin is used, based on the total weight of the raw material lignocellulosic particles. The amount used is reported in the Examples. In the Examples, the lignocellulosic particles are either sawdust or medium density fibers (MDF).

4. A form is used to set the desired size of the board, the furnish material is layered on the bottom caul plate. In the Examples, a 6 inch by 11 inch aluminum form is used. The caul plate is transferred into the press and covered with another preconditioned caul plate.

5. The material is pressed under heat and pressure to produce a board using typical conditions. Pressing time and temperature vary with board thickness and the raw material. In the Examples, the boards are pressed for 2 minutes at 350° F. and 520 psi. The press is opened and the caul plates and board are removed from the press.

6. A successful event is one after which the board (a) is readily removed from caul plates without difficulty, (b) without leaving residue on the caul plates and (c) without causing surface imperfections on the board resulting from sticking.

7. Repeat steps 2–5 using the same set of caul plates without applying any additional external press release.

8. The number of boards successfully made is a measure of the performance of the parting agent. The higher the number, the better the parting agent. The percent binder resin used is a weight percent based on the total weight of the raw material.

TABLE 3

| Example | Raw material | Parting agent in binder resin | Wt. % parting agent in binder resin | Wt. % binder used | Wt. % synergist in the binder resin | # of boards pressed |
|---|---|---|---|---|---|---|
| 1 | MDF | Example 3 | 10 | 4 | none | 5 |
| 2 | MDF | Example 2 | 10 | 4 | none | 9 |
| 3 | MDF | Example 2 | 10 | 4 | 10% NMP | 6 |
| 4 | MDF | Example 2 | 5 | 4 | 5% NMP | 6 |
| 5 | Sawdust | Example 1 | 5 | 4 | none | 7 |
| 6 | MDF | Example 1 | 5 | 4 | 5% NMP | 12 |
| 7 | MDF | None | 0 | 4 | none | 1 |

Example 7 is a control where no parting agent was used in the binder resin. With no parting agent, only one board could be pressed before re-applying the external release agent. Examples 1–6 show that the parting agents of the present invention impart desirable properties to the binder resins of the present invention, in that their use in the binder resins enables 5 to 12 boards to be pressed without re-application of the external release agent.

In addition, all binder resins in Examples 1–6 are of a single phase and homogeneous, indicating that the parting agent is compatible with the di- or polyisocyanate, and that the binder resins are stable.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method for preparing a compression molded or pressed lignocellulosic article comprising the steps of:
    a) forming a binder resin by combining from about 75 to 99.5 weight percent based on the total weight of the binder resin of a polyisocyanate component with from about 25 to 0.5 weight percent based on the total weight of the binder resin of a parting agent, the parting agent comprising the reaction product of an isocyanate compound and an isocyanate-reactive compound of the general structure

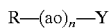

wherein
    R is a hydrophobic group containing alkyl, alkaryl, or polyaryl, moieties, wherein the alkyl moieties comprise straight chain or branched hydrocarbons with 6 or more carbon atoms, the alkaryl moieties comprise monoalkyl, dialkyl, or trialkyl substituted aromatic hydrocarbons with 9 or more carbon atoms, and the polyaryl moieties comprise a polyphenyl structure that is either alkyl substituted or unsubstituted;
    (ao) is an alkylene oxide or mixture of alkylene oxides selected from the group consisting of ethylene oxide, propylene oxide, butylene oxide, and mixtures thereof;
    n is from 1 to 25; and
    Y represents a monofunctional isocyanate-reactive group;
    b) forming a resinated lignocellulosic mixture by combining from about 1 to 10 weight percent based on the total weight of the lignocellulosic mixture of the binder resin with from about 99 to 90 weight percent based on the total weight of the lignocellulosic mixture of lignocellulosic particles, the lignocellulosic particles having a moisture content of from 2 to 15 weight percent; and
    c) forming a compression molded or pressed lignocellulosic article by compressing the resinated lignocellulosic mixture at an elevated temperature and under pressure.

2. The method according to claim 1, comprising forming the parting agent with an aromatic isocyanate compound.

3. The method according to claim 1, comprising forming the parting agent with an isocyanate-reactive compound wherein R comprises a polyaryl group.

4. The method according to claim 3, comprising forming the parting agent with an isocyanate-reactive compound wherein n is from 1 to 10.

5. The method according to claim 1, comprising forming the binder resin and the parting agent with one or more isocyanates selected from the group consisting of diphenylmethane-2,4'-diisocyanate, diphenylmethane-4,4'-diisocyanate, diphenylmethane-2,2'-diisocyanate, polymeric diphenylmethyl diisocyanate, and mixtures thereof.

6. The method according to claim 1, wherein step a) comprises combining from about 90 to about 99.5 percent by weight of said polyisocyanate component with from about 0.5 to about 10 percent by weight of said parting agent.

7. The method according to claim 1, wherein step a) further comprises adding from 0.5 to 15 weight percent based on the total weight of a synergist selected from the group consisting of $C_{1-4}$ N-alkylpyrrolidones, gamma-butyrolactone, and mixtures thereof to the binder resin.

8. The method according to claim 7, comprising adding N-methyl-2-pyrrolidone as the synergist.

9. The method according to claim 1, wherein the temperature is elevated to from 100 to 300° C.

10. The method according to claim 9, wherein the temperature is elevated to from 180 to 240° C.

11. The method according to claim 1, comprising setting the pressure at from 300 to 800 pounds per square inch.

12. The method according to claim 1, wherein step c) further comprises compressing the resinated lignocellulosic mixture for from 200 to 300 seconds.

13. A method according to claim 1 wherein step c) comprises forming a compression molded or pressed lignocellulosic board.

14. The method according to claim 1, wherein step b) comprises forming the resinated lignocellulosic mixture by combining the binder resin with lignocellulosic particles having a moisture content of from 3 to 12 weight percent.

15. The method according to claim 1, wherein step b) comprises forming the resinated lignocellulosic mixture by combining the binder resin with lignocellulosic particles having a moisture content of from 4 to 10 weight percent.

16. The method according to claim 1, wherein step a) comprises forming the parting agent using an isocyanate-reactive compound where Y is either a hydroxyl group or a monoalkyl group.

17. The method according to claim 1, wherein the parting agent is formed by combining at least one MDI isomer with an isocyanate-reactive compound where R comprises an alkaryl and Y is a hydroxyl group.

18. The method according to claim 17, wherein the parting agent is formed with an isocyanate-reactive compound where n is from 1 to 10.

19. The method according to claim 1, wherein the parting agent is formed by combining at least one MDI isomer with an isocyanate reactive compound where R comprises a polyalkaryl and Y is a hydroxyl group.

20. The method according to claim 19, wherein the parting agent is formed from an isocyanate-reactive compound where n is from 1 to 10.

* * * * *